April 24, 1934.  C. W. VOGT  1,956,141
APPARATUS FOR PROCESSING MATERIAL
Filed May 2, 1931  2 Sheets-Sheet 1
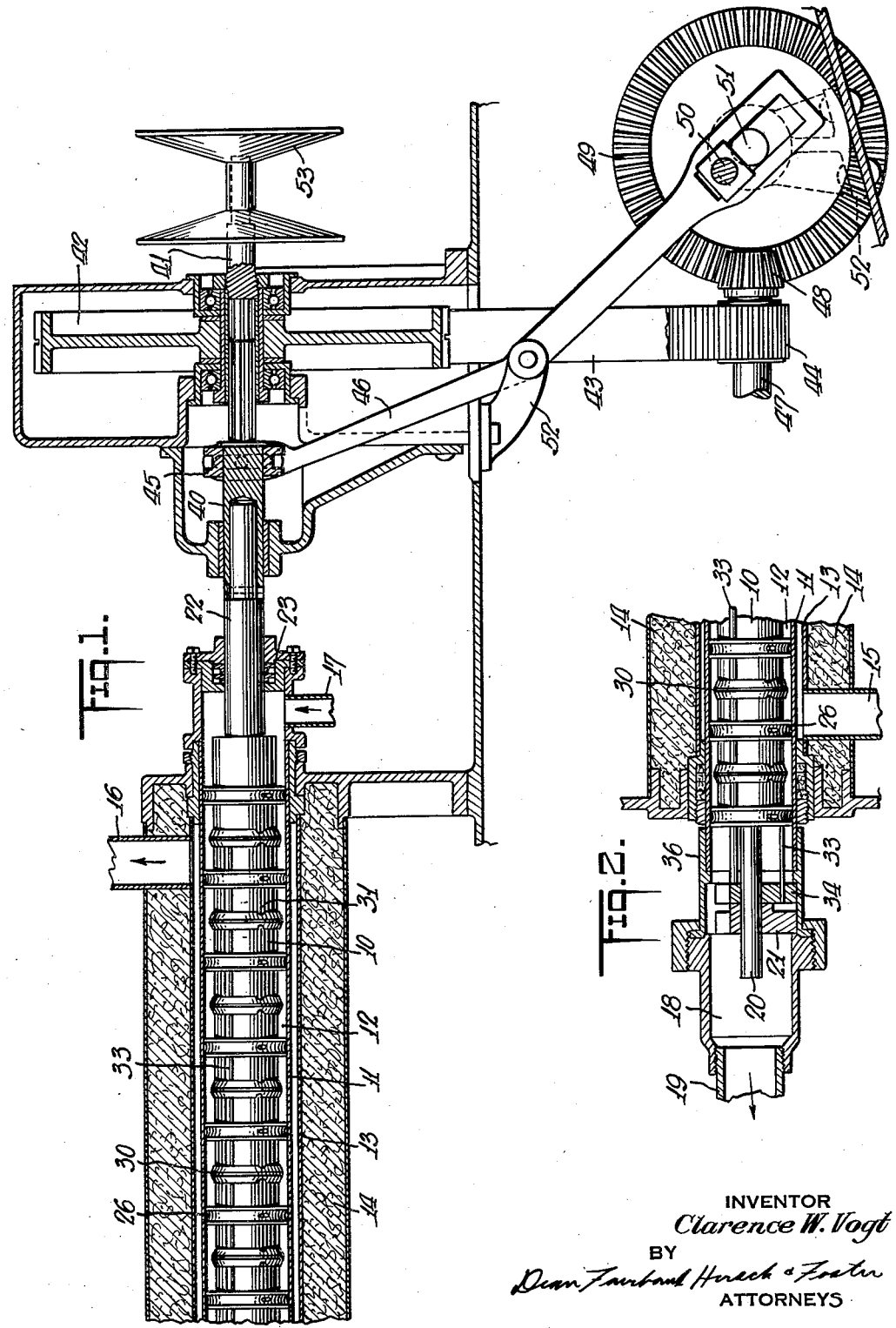
INVENTOR
*Clarence W. Vogt*
BY
*Dean Fairbank Hirsch & Foster*
ATTORNEYS

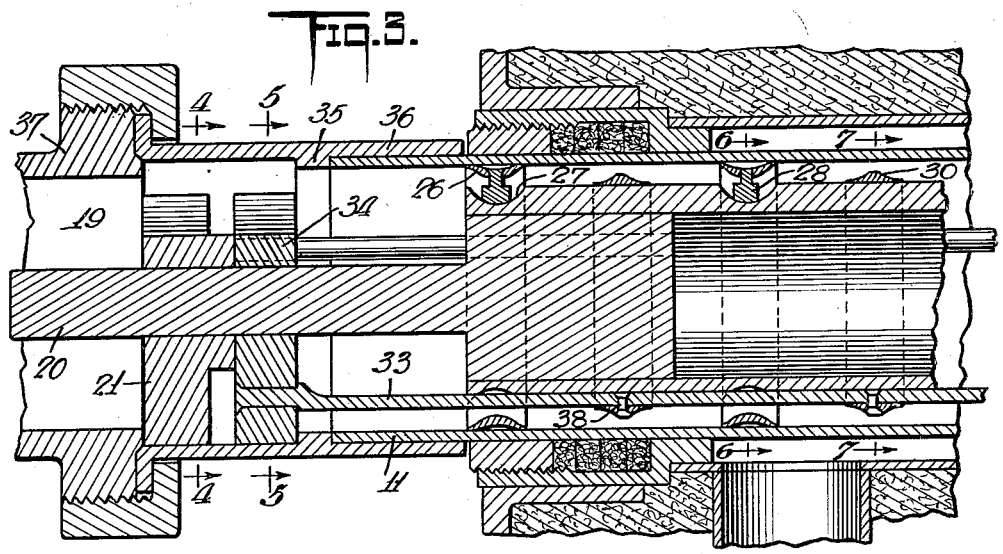
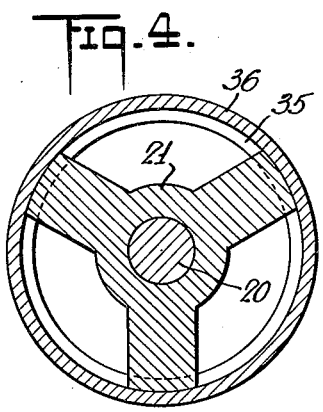
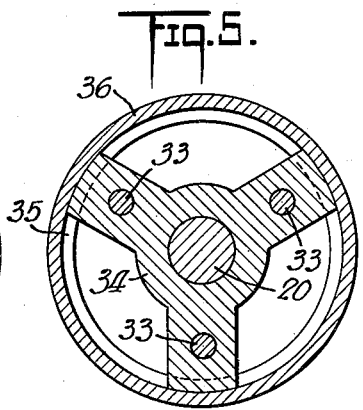
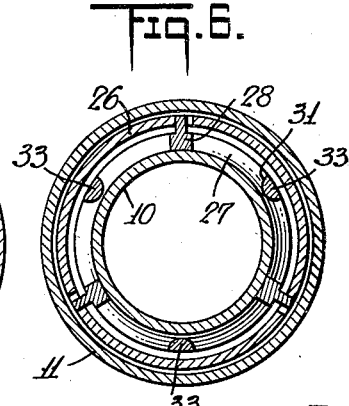
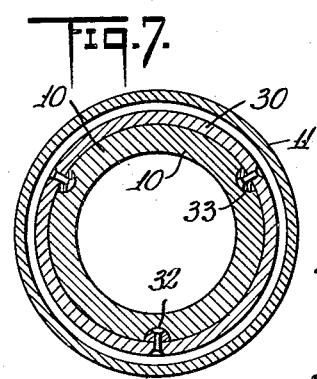
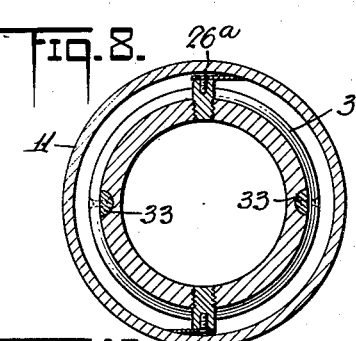
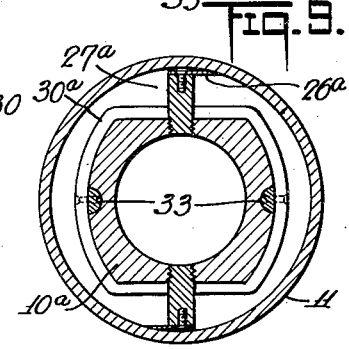
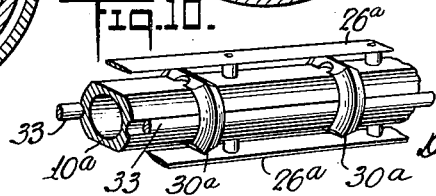

Patented Apr. 24, 1934

1,956,141

UNITED STATES PATENT OFFICE 1,956,141

APPARATUS FOR PROCESSING MATERIAL

Clarence W. Vogt, Louisville, Ky., assignor to Vogt Instant Freezers, Incorporated, Louisville, Ky., a corporation of Delaware Application May 2, 1931, Serial No. 534,539

26 Claims. (Cl. 257—84)

In my prior Patents 1,783,864, 1,783,865, 1,783,866 and 1,783,867, issued Dec. 2, 1930, I have disclosed and broadly claimed certain processes and apparatus for the processing of material in a comparatively thin, confined layer subjected to the action of a temperature changing medium, the material forming said layer being caused to flow under pressure while being subjected to mechanical agitation.

In the apparatus illustrated in said patents, the thin confined layer is formed between the outer surface of a shaft and the inner surface of an outer concentric tube, the shaft and tube being relatively rotatable, one of them being subjected to the action of a temperature changing medium, and one of them having agitating means projecting into the annular space confining the layer. Such agitating means as illustrated in said patents effectively prevents the collecting or adhering of a film of any appreciable thickness on the heat transfer surface, but in the treatment of certain materials, for instance, whites and/or yolks of eggs, it is not desirable to subject the material to excessive agitation, particularly after becoming partially solidified. Furthermore, with some materials, particularly with comparatively gentle agitation, there appears to be a tendency of the material to adhere to the surface bearing the agitating members.

My present invention may be employed in apparatus of the type shown in said patents and for carrying out the processes there disclosed, but is capable of use in certain types of apparatus regardless of the thickness of the layer, the use of pressure, and other features disposed in said patents.

In prior Patent 1,847,149, issued March 1, 1932, there is shown a type of agitating means in which there are provided cutter members for continuously removing the film from the heat transfer surface and which are so designed and mounted that they permit the free flow of the material beneath the cutting means and the reengagement of the material with the heat transfer surface. Any adhering of the material to the surface of the shaft tends to retard or interfere with the desired free and uniform flow and treatment of portions of the material forming the layer.

One of the objects of the present invention is to provide a type of agitating means which will serve to prevent the accumulation of material on either of the walls defining the heat treating space.

A further object of my invention is to provide a simple form of agitating and cutting means adapted for use in a comparatively thin chamber without reducing to an undesirable extent the cross-sectional area of said space.

A further object is to provide an agitating and cutting means which will operate effectively irrespective of slight eccentricity of the walls defining the annular space in which the material is being treated.

As one important feature of my invention I provide agitating and cutting means operable by movement lengthwise of the chamber rather than merely circumferentially thereof.

The agitating means for cutting the layer from the outer surface may be of the general type shown in prior Patent 1,847,149 granted on application Serial No. 374,594, above referred to, and may be used in connection with an annular cutting member movable lengthwise of the chamber for removing from the surface of the shaft any material adhering thereto.

As the cutting means operating in connection with the outer wall is preferably carried by and rotatable with the shaft forming the inner wall of the chamber, any eccentricity of the two walls gives a non-uniform action of the cutting means on the outer wall unless such means be movable radially in respect to the shaft.

As one important feature of my invention the means for cutting the material from the outer wall is of annular form and axially movable whereby it may be mounted to float to a limited extent in a radial direction, and although driven from the shaft may properly and uniformly contact with the outer wall irrespective of any slight eccentricity of the two walls.

In a preferred embodiment of the invention separate annular cutting members are employed, one or more for removing the film from the inner surface of the chamber, and another for removing the film from the outer surface, all of said members being rotatable with the shaft forming the inner surface and having relative axial movement in respect to both of said surfaces to effect the cutting actions.

The shaft itself may be axially movable and effect the axial movement of the cutting members acting on the outer surface, while the other annular members for removing the film from the shaft may be held against axial movement and act on the shaft by reason of the axial movement of the latter.

Obviously various different forms of cutting and agitating means may be designed within the scope of my broad invention.

In the accompanying drawings I have illustrated several forms embodying the broad invention and certain of which include structural features important to more specific phases of the invention.

In these drawings:

Fig. 1 is a central longitudinal section of a portion of an apparatus embodying my invention, only the inlet end section of the processing chamber being illustrated.

Fig. 2 is a section similar to a portion of Fig. 1, but showing the outlet or delivery end section of the processing chamber.

Fig. 3 is a section similar to a portion of Fig. 2, but on a larger scale.

Figs. 4, 5, 6 and 7 are transverse sections on the lines 4—4, 5—5, 6—6 and 7—7 respectively of Fig. 3.

Fig. 8 is a transverse section somewhat similar to Figs. 6 and 7, but showing the outer cutter mounted for circumferential, but not longitudinal, movement.

Fig. 9 is a section similar to Fig. 8, but showing a form with an enlarged passage beneath the circumferentially moving cutters, and Fig. 10 is a perspective view on a smaller scale of the parts shown in Fig. 9.

The form of apparatus illustrated in the accompanying drawings is designed as an embodiment of the apparatus inventions, and for carrying out the process inventions disclosed and claimed in my prior patents of Dec. 2, 1930, although it will be obvious that the present invention may assume various different forms within the scope of the appended claims and independent of any invention or inventions claimed in said patents.

In the construction illustrated there is provided a shaft 10 disposed within a slightly larger tube 11 so as to form an annular chamber 12 therebetween and through which the material to be processed is caused to flow. Encircling the tube is a second tube 13, the space between said tubes serving for the circulation of a temperature changing medium, for instance, ammonia or brine, if the processing involves refrigerating action. Outside of the tube 13 there is provided suitable heat insulation 14.

The refrigerant chamber or space between the tubes 11 and 13 is provided with an inlet 15 adjacent to one end for the temperature changing medium, and an outlet 16 adjacent to the opposite end for the outflow of such medium.

Material to be processed is delivered by a pump through an inlet 17 to the thin annular space between the surfaces of the shaft 10 and tube 11, said inlet being disposed at the same end of the apparatus as is the outlet 16 whereby the material and refrigerant flow in countercurrent.

An outlet from the annular space forming the processing chamber may be coaxial with the shaft and may be connected to a suitable delivery conduit 19, whereby the material after being processed may be delivered under pressure to receptacles or to any other suitable apparatus.

The shaft 10 at the delivery end has an extension 20 of reduced diameter mounted in a suitable bearing in a spider 21, while the shaft at the opposite end has a reduced portion 22 extending through a suitable stuffing box 23.

The apparatus so far described may be substantially as shown in any of the patents of Dec. 2, 1930, above referred to, and may include a single processing chamber or a plurality connected in series. In my present invention there is provided means for cutting or scraping the material from both of the opposed surfaces defining the thin, annular, confined space 12 and formed by the shaft 10 and the tube 11, instead of merely one of them, as shown in said patents.

In the form shown in Figs. 1 to 7 inclusive there are provided two separate scraping means, both annular in form and each being relatively movable axially in respect to the surface with which it cooperates. The shaft 10 is mounted for longitudinal movement and carries the agitating and cutting members which engage the outer surface of the processing chamber, while the agitating or cutting members which engage the inner surface are held against longitudinal movement, and thus act upon the surface of the shaft during the reciprocation of the latter.

The cutting and agitating members which engage the outer surfaces of the annular processing chamber are in the form of rings 26, each having an external diameter approximately equal to the internal diameter of the tube 11. They present comparatively sharp, endwise facing, annular edges for cutting or scraping action in respect to the tube as said members are moved back and forth axially within the tube. The outer periphery of each ring may be cut away or grooved so as to reduce the area in frictional contact with the tube. The inner surface of each member may be curved so that it does not present any shoulders or direct abutting surfaces interfering with the free longitudinal flow of the material or the longitudinal movement of the member in the material. Thus each member may be substantially crescent shaped in cross-section.

The members 26 are spaced from, but secured to the shaft, so as to be rotated by and moved longitudinally with the shaft. In order to reduce to a minimum the resistance to endwise flow of the material through the chamber and endwise movement of the members in the material, the outer surface of the shaft is preferably provided with an annular groove 27 concentric with and positioned inside of each cutting member 26 so that the cross-sectional area of the processing chamber will not be materially reduced by the cutting members 26. These grooves are constructed as embodiments of the broad invention claimed in Patent 1,847,149 above referred to.

As the shaft and the cutting member 26 are moved endwise, the material flowing in the processing chamber will be scraped from the surface of the tube 11 and caused to pass through the groove 27 beneath the cutting member 26 and re-applied to the surface of the tube.

The members 26 may be supported from the shaft in any suitable manner, as for instance, by a plurality of radially extending pins 28 as shown in Figs. 3 and 6. The cutting members may be made somewhat after the fashion of split piston rings and may be slightly resilient so as to exert a slight outward pressure, and may thus be made free to expand or contract in respect to the shaft and the connecting pins or driving connections 28, and to float in a transverse radial plane in case the walls of the chamber are not truly concentric. The rings may be made sectional so that each section will be held against the surface of the tube 11 by the action of centrifugal force during operation.

In addition to the cutting and agitating members 26 I provide a second set of cutting or agitating members 30 which act upon the outer surface of the shaft 10. These may be constructed similar to the members 26 except that their outer surfaces may be convex so that the opposite, axially facing, cutting edges will act on the inner rather than the outer surface of the chamber. These agitating and cutting members 30 are held against longitudinal movement so that they exert a scraping action on the surface of the shaft during the endwise movement of the latter. Each cutting member 30 is disposed between a pair of the cutting members 26 and the latter are spaced apart axially to such a distance as will approximately correspond to the range of endwise movement of the shaft.

In Figs. 1 and 3 the parts are shown in a position midway between the extremes of the range of movement. The shaft and the members 26 may be moved endwise in one direction until a groove 27 reaches the cutting edge of a member 30, but to still permit flow of the material between the members 26 and 30. The shaft is then moved in the opposite direction until the groove 27 beneath the next adjacent member 26 reaches the opposite edge of the member 30. Thus the entire area on the shaft between adjacent grooves is subjected to the action of the members 30, while substantially the entire inner surface of the tube 11 is subjected to the action of the members 26.

The edges of the members 30 may be provided with notches or grooves 31 which may receive the pins or driving connections 28 when in extreme limiting position.

Various means may be employed for holding the members 30 against endwise movement during the endwise movement of the shaft, and at the same time causing rotation of said members. As illustrated, the surface of the shaft 10 is provided with a plurality of grooves 32 extending lengthwise of the periphery thereof, each groove being, for instance, substantially semi-circular in cross-section. Within each groove is mounted a rod 33 which may correspond in shape and size to the groove so that the outer surface of the rod is substantially in the arc of the circle defining the circumference of the shaft. These rods 33 may be secured to a spider 34 so as to be held against longitudinal movement. The spider may be secured against endwise movement in various different ways, but merely as an example, I have shown this spider abutting against an inwardly extending flange 35 on a tubular member 36 which encircles the projecting end of the tube 11. The opposite end of the tubular member is connected by a union to a second tubular member 37 which latter is connected to the delivery tube 19. The union is so designed that the member 37 abuts against the spider 21 so as to hold both of the spiders between the flange 35 and the tubular member 37 and prevent endwise movement, but sufficiently loosely so as to permit rotation of the spider 34 with the shaft. The spider 34 may be keyed (not shown) to the shaft and the spider 21 secured to the tube by set screws (not shown) or other means.

As previously noted, one of these spiders serves as a bearing for the shaft, while the other serves to hold the rods 33 against endwise movement.

Each rod 33 has its outer surface adjacent to the inner surfaces of the several members 30 and these members are secured to the rods in any suitable manner, as for instance by screws or rivets 38. The grooves 32 and rods 33 are preferably spaced peripherally of the shaft midway between successive pins 28 which connect the shaft to the outer cutting members 26 as shown in Fig. 6.

As the parts of the apparatus are formed of metal having a high coefficient of heat transfer, it is desirable that the members 26 and 30 be arranged to act on substantially the entire length of the surfaces even though the end portions of said surfaces extend beyond the ends of a jacket for the refrigerant or other temperature changing medium.

Various means may be employed for effecting the reciprocation and rotation of the shaft. As illustrated in Fig. 1, the extension 22 of the shaft 10 is connected to a drive shaft 40 keyed to and slidable within a second shaft 41. On the shaft 41 is means for effecting the rotation, said means being illustrated as a sprocket wheel 42 connected by a drive chain 43 to a driving pinion 44.

For effecting reciprocation of the shaft 10, the shaft 40 is provided with a grooved collar 45 engaging pins of a yoke on a pivoted arm 46. The swinging of this arm moves the shaft 40 and the shaft 10 back and forth endwise without effecting endwise movement of the shaft 41.

For swinging the arm 46 the main power shaft 47 of the pinion 44 is provided with a bevel pinion 48 for rotating at slower speed a bevel gear 49. On the shaft of the latter there is provided a crank 50 having sliding connections in a slot 51 in the end of the arm 46. The arm is pivoted intermediate of its ends, as for instance on a bracket 52, so that as the crank 50 rotates, the arm is caused to swing back and forth and cause the reciprocation of the shaft 10.

The shaft 41 is also preferably provided with a pulley 53 forming a part of a Reeves drive and whereby the pump which supplies the material to the inlet 17 may be driven and the speed of the pump varied at will in respect to the speed of rotation of the shaft 10. I have not illustrated the construction of the Reeves drive and the adjustment thereof, or the connections to the pump, as these may be of the usual construction well known in the art. If desired, the adjustment of the Reeves drive may be made automatically in accordance with the torque on the shaft 10 or in accordance with the stiffness or plasticity of the material delivered by the apparatus, in accordance with my broad invention disclosed and claimed in my prior patents above referred to.

In the constructions above described, the cutting member which acts on or adjacent to the surface of the tube 11 cuts and agitates by longitudinal movement. This is not essential as the agitating and cutting may be due solely or primarily to the circumferential movement.

In Figs. 8, 9 and 10 I have shown a construction in which the annular members 26 are omitted and replaced by cutter blades 26a extending lengthwise of the processing chamber and carried by the shaft. These members clear the inner surface of the tube 11 while rotating, and at the same time the relative longitudinal movement of the shaft and the cutting members 30a clears the surfaces of the shaft. In this construction it is not essential that the shaft and the cutting members 26a be movable endwise. The rods may be connected to suitable means for moving them and the annular members 30 endwise in respect to the shaft.

In Figs. 9 and 10 the shaft 10a is shown as flattened upon opposite sides beneath the cutting members 26a so as to provide passages 27a corresponding in function to the groove 27, that is, it permits of the use of a processing chamber which is comparatively thin, and at the same time permits free flow of the material beneath the cutting member during the operating movement of the latter through the material forming the layer. In this case the annular members 30a may be correspondingly flattened to act on the shaft around the entire periphery.

From the foregoing it will be seen that I provide a cutting and agitating member mounted to reciprocate in the chamber and preferably back and forth in the direction of flow of the material through the chamber, if such material be subjected to continuous flow. As to certain features of my invention, it is immaterial whether or not the walls be parallel, and whether the walls be curved, flat or of other form, and whether the material be heated or cooled in processing, and whether or not the walls be relatively rotatable or otherwise movable.

Having thus described my invention, what I claim as new and desire to secure by Letters Patent is:

1. A processing apparatus, including an annular processing chamber having opposite, substantially parallel, relatively rotatable walls, means for subjecting one of said walls to the action of a temperature changing medium, an annular member in said chamber and disposed in a plane at right angles to the axis thereof, and means for imparting to said member an axial and a rotational movement to agitate the material being processed and to remove from one of said walls material tending to accumulate thereon.

2. A processing apparatus, including an annular processing chamber having opposite, substantially parallel, relatively rotatable walls, an annular member disposed in a plane substantially at right angles to the axis of and within said chamber, said member being carried by one of said walls and having a circular surface engaging with the other wall, and means for moving said member axially to scrape from said last mentioned wall any material adhering thereon.

3. A processing apparatus, including an annular processing chamber having a substantially stationary outer wall and an inner wall, means for imparting rotational and axial movement to said inner wall, and means carried by said inner wall but held against axial movement therewith for removing material tending to adhere to the inner wall during the processing operation.

4. A processing apparatus, including an annular processing chamber having opposite substantially parallel walls, an annular member engaging one of said walls, a separate annular member engaging the outer wall, and means for effecting relative axial movement of said members and walls to clear from the latter material adhering thereto.

5. A processing apparatus, including an annular processing chamber having opposite substantially parallel walls, an annular member engaging one of said walls, a separate annular member engaging the other wall, both of said members being carried by the same wall, means for effecting relative rotation of said walls, and means for effecting relative axial movement of one member in respect to the other.

6. A processing apparatus, including an annular processing chamber having spaced parallel walls, a pair of annular members carried by one wall and one having scraping relationship to one wall and the other having scraping relationship to the other wall, and means for effecting relative axial movement of each member and the wall with which it has scraping relationship.

7. A processing apparatus, including an annular processing chamber having opposite substantially parallel walls, one of said walls being stationary and the other longitudinally movable, a pair of annular members carried by one of said walls and one having scraping relationship to one wall and the other having scraping relationship to the other wall, means for effecting axial movement of the member which has scraping relationship to the stationary wall, and means for holding against axial movement the member having scraping relationship to the longitudinally movable wall.

8. A processing apparatus, including an annular processing chamber having substantially parallel spaced walls, a series of axially spaced, circumferentially extending, scraping members engaging one of said walls, a second series of axially spaced, circumferentially extending, scraping members engaging the other wall, and means for effecting relative axial movement of all of said scraping members and the walls with which they engage.

9. A processing apparatus, including an annular processing chamber having oppositely disposed parallel walls, one of said walls being stationary, means for rotating and axially moving the other of said walls, a series of scraping members carried by said rotatable wall, engaging said stationary wall, and movable axially with said rotatable wall, a second series of scraping members carried by said rotatable wall and engaging the periphery thereof, and means for holding said last mentioned members against axial movement.

10. A processing apparatus, including an annular processing chamber having spaced substantially parallel walls, one of said walls having an annular groove therein, and an annular agitating and cutting member carried by said last mentioned wall, disposed adjacent to the other of said walls, encircling said groove but spaced therefrom to form a passage lengthwise of the chamber, and of a cross-section not materially less than the cross-section of the chamber at one side of said groove and member, said walls being relatively movable axially.

11. A processing apparatus, including an annular processing chamber having substantially parallel spaced walls, means for effecting relative axial movement of said walls, and an annular member carried by one of said walls and positioned adjacent to the other wall for removing material tending to adhere thereto during said axial movement, the wall carrying said member having an annular groove registering with said annular member and permitting axial flow of the material through said chamber past said member.

12. A processing apparatus, including an annular processing chamber having substantially parallel spaced walls, means for effecting relative axial movement of said walls, an annular member carried by one of said walls and positioned adjacent to the other wall for removing material tending to adhere thereto during said axial movement, the wall carrying said member having an annular groove registering with said annular member and permitting axial flow of the material through said chamber past said member, and a second annular member positioned adjacent to the first mentioned wall and having relative axial movement in respect thereto for removing material tending to adhere thereto.

13. A processing apparatus, including an annular processing chamber having oppositely disposed substantially parallel walls, an agitating and cutting member extending lengthwise of the chamber and relatively rotatable in respect to one wall for clearing from the latter material tending to adhere thereto, and a second agitating and cutting member extending circumferentially of said chamber and relatively movable axially in respect to the other wall for removing therefrom material tending to adhere thereto.

14. A processing apparatus, including an annular processing chamber having opposed, substantially parallel, spaced walls, one of said walls having a plurality of longitudinally extending grooves therein, an annular member encircling and having scraping relationship to said wall, rods disposed within said grooves and engaging said annular member, and means for effecting relative longitudinal movement of said rods and said wall.

15. A processing apparatus including a pair of substantially parallel walls, one movable endwise in respect to the other and having a groove therein extending transversely to the direction of movement of said wall, and a scraper carried by said movable wall and opposite to said groove and disposed adjacent to the other wall for removing material adhering to the latter.

16. A processing apparatus including a pair of substantially parallel walls, one movable endwise in respect to the other, a scraper disposed adjacent to one wall and movable with the other wall, said last mentioned wall having a passage beneath said scraper and of a depth substantially equal to the distance between said walls.

17. A processing apparatus including a pair of substantially parallel walls, one movable endwise in respect to the other and having lengthwise and transverse grooves, a pair of scrapers carried by said movable wall, one of said scrapers being opposite to said transverse groove whereby the groove forms a passage beneath the scraper, and said scraper being movable endwise with said movable wall, and means in said lengthwise groove for holding the other scraper against endwise movement.

18. A processing apparatus including a pair of substantially parallel walls, one movable endwise in respect to the other and having a groove lengthwise thereof, a scraper for removing material from said last mentioned wall, and means in said groove for holding said scraper against longitudinal movement.

19. A processing apparatus including a pair of parallel walls spaced apart to form a processing chamber, two series of members in said chamber and spaced apart lengthwise of said chamber, the members of the two series being alternately arranged, and means for effecting relative endwise movement of one series of members in respect to one wall to remove material from the latter, and for effecting relative endwise movement of the other series of members and the other wall for removing material from said last mentioned wall.

20. A processing apparatus including a pair of parallel walls spaced apart to form a processing chamber, one of said walls being stationary and the other movable endwise, two series of members in said chamber and spaced apart along the length of said chamber, the members of the two series being alternately arranged, the members of one series serving to remove material from the endwise movable wall and having means for holding said members against endwise movement, and the other series of members serving to remove material from said stationary wall and having means for moving them endwise in respect to said stationary wall.

21. A processing apparatus having a pair of annular concentric walls spaced apart to form a comparatively thin annular processing chamber, two series of annular members in said chamber and spaced apart axially thereof, the members of the two series being alternately arranged, and means for effecting relative axial movement of the members of one series and one of said walls to remove material from the latter, and for effecting relative axial movement of the other series of members and the other wall to remove material from the latter.

22. A processing apparatus including a pair of annular concentric walls relatively rotatable and relatively movable axially, said walls being spaced apart to form an annular processing chamber therebetween, a scraper extending lengthwise of said chamber, carried by one wall and acting to remove material from the other wall during said relative rotation, and an annular scraper held against endwise movement and acting to remove material from the other wall during said relative endwise movement of said walls.

23. A processing apparatus including a pair of substantially parallel walls spaced apart to form a comparatively thin chamber therebetween, and a pair of scrapers in said chamber, said scrapers being relatively movable toward and from each other, one of said scrapers acting to remove material from one wall and the other to remove material from the other wall.

24. A processing apparatus including a pair of substantially parallel walls spaced apart to form a comparatively thin chamber therebetween having an inlet at one end and an outlet at the other, for the continuous flow of material therethrough, and a pair of scrapers in said chamber, said scrapers being relatively movable toward and from each other, and back and forth in the direction of flow of the material through said chamber, one of said scrapers acting to remove material from one wall and the other to remove material from the other wall.

25. A processing apparatus including a casing having a peripheral wall, a member enclosed within said casing and movable endwise in respect to said wall, a scraper carried by said movable member within said casing but held against axial movement therewith for removing material adhering to said member during endwise movement of said member in each direction, and means also carried by said member for agitating the material within said casing.

26. A processing apparatus including a casing having a peripheral wall, a member enclosed within said casing and movable endwise in respect to said wall, a scraper carried by said movable member within said casing but held against axial movement therewith for removing material adhering to said member during endwise movement of said member in each direction, and means for applying a temperature changing medium to the exterior of said wall.

CLARENCE W. VOGT.